United States Patent
Takao et al.

(10) Patent No.: US 11,427,707 B2
(45) Date of Patent: Aug. 30, 2022

(54) CURABLE EPOXY RESIN COMPOSITION AND FIBER-REINFORCED COMPOSITE MATERIAL USING SAME

(71) Applicant: NIPPON STEEL CHEMICAL & MATERIAL CO., LTD., Tokyo (JP)

(72) Inventors: Yasuyuki Takao, Tokyo (JP); Yuichi Taniguchi, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 249 days.

(21) Appl. No.: 16/647,985

(22) PCT Filed: Sep. 20, 2018

(86) PCT No.: PCT/JP2018/034908
§ 371 (c)(1),
(2) Date: Mar. 17, 2020

(87) PCT Pub. No.: WO2019/065470
PCT Pub. Date: Apr. 4, 2019

(65) Prior Publication Data
US 2020/0255651 A1   Aug. 13, 2020

(30) Foreign Application Priority Data

Sep. 29, 2017 (JP) .............................. JP2017-190417

(51) Int. Cl.
| | |
|---|---|
| *C08L 63/00* | (2006.01) |
| *C08J 5/04* | (2006.01) |
| *C08J 5/24* | (2006.01) |
| *C08L 63/04* | (2006.01) |
| *C08K 5/315* | (2006.01) |
| *C08K 5/3472* | (2006.01) |
| *C08K 5/3492* | (2006.01) |

(52) U.S. Cl.
CPC .................. *C08L 63/00* (2013.01); *C08J 5/04* (2013.01); *C08J 5/24* (2013.01); *C08L 63/04* (2013.01); *C08J 2363/00* (2013.01); *C08K 5/3155* (2013.01); *C08K 5/3472* (2013.01); *C08K 5/3492* (2013.01)

(58) Field of Classification Search
None
See application file for complete search history.

(56) References Cited

U.S. PATENT DOCUMENTS

| | | | |
|---|---|---|---|
| 6,043,333 A * | 3/2000 | Kuboki | C08G 59/3218 528/98 |
| 2003/0082385 A1 | 5/2003 | Li et al. | |
| 2006/0035088 A1 * | 2/2006 | Takano | C08G 59/18 428/413 |
| 2012/0071585 A1 * | 3/2012 | Nohara | C08G 59/304 523/433 |
| 2016/0002390 A1 | 1/2016 | Hughes et al. | |
| 2016/0280871 A1 | 9/2016 | Kaneko | |
| 2016/0297959 A1 | 10/2016 | Ishimoto et al. | |
| 2017/0291985 A1 | 10/2017 | Takaiwa et al. | |
| 2017/0369700 A1 * | 12/2017 | Mitobe | C08J 5/04 |
| 2018/0155489 A1 | 6/2018 | Ushiyama et al. | |
| 2021/0253783 A1 * | 8/2021 | Sato | C08G 59/14 |

FOREIGN PATENT DOCUMENTS

| | | |
|---|---|---|
| EP | 3564289 A1 | 11/2019 |
| JP | H01-201321 A | 8/1989 |
| JP | H08-20654 A | 1/1996 |
| JP | 2003-128764 A | 5/2003 |
| JP | 2005-225982 A | 8/2005 |
| JP | 2010-248479 A | 11/2010 |
| JP | 2010-265371 A | 11/2010 |
| JP | 2014-185256 A | 10/2014 |
| JP | 2016-504472 A | 2/2016 |
| JP | 2016-222935 A | 12/2016 |
| JP | 2017-101227 A | 6/2017 |
| JP | 2017-149988 A | 8/2017 |
| WO | 2015/080035 A1 | 6/2015 |
| WO | 2016/035459 A1 | 3/2016 |
| WO | WO-2016104314 A1 * | 6/2016 ............. C08J 5/042 |

OTHER PUBLICATIONS

Supplementary European Search Report dated May 26, 2021, isssued for European Patent Application No. 18861076.0.
International Search Report dated Dec. 11, 2018, issued for PCT/JP2018/034908.
English Translation of International Preliminary Report on Patentability Chapter II dated Mar. 23, 2020, issued for PCT/JP2018/034908.

* cited by examiner

*Primary Examiner* — Megan McCulley
(74) *Attorney, Agent, or Firm* — Locke Lord LLP; James E. Armstrong, IV; Nicholas J. DiCeglie, Jr.

(57) ABSTRACT

Provided is a resin composition for a fiber-reinforced composite material that has low tackiness when turned into a prepreg, has satisfactory handleability, and can be suppressed in deformation at the time of its release from a mold in a PCM method. The resin composition is a resin composition for a fiber-reinforced composite material including, as essential components: a liquid epoxy resin (A); a novolac-type epoxy resin (B); a polymer component (C) having a molecular weight of 10,000 or more; dicyandiamide (D); and an imidazole-based curing aid (E), wherein the resin composition includes 10 parts by mass to 35 parts by mass of the liquid epoxy resin (A), and 10 parts by mass to 25 parts by mass of the polymer component (C) out of 100 parts by mass of the total of the components (A) to (E), and has a glass transition temperature of 0° C. or more before its curing.

19 Claims, No Drawings

CURABLE EPOXY RESIN COMPOSITION AND FIBER-REINFORCED COMPOSITE MATERIAL USING SAME

TECHNICAL FIELD

The present invention relates to a resin composition that cures rapidly, has a low viscosity, and is excellent in long-term viscosity stability, the resin composition serving as a matrix resin material for a fiber-reinforced composite material that provides a molded product having high heat resistance and high toughness at the time of its curing while being easy to handle because of its low tackiness at the time of handling at room temperature.

BACKGROUND ART

A fiber-reinforced composite material has been widely applied as a structural material for an aircraft, an automobile, civil engineering and construction, sporting goods, and the like because the material includes reinforcing fibers, such as glass fibers, aramid fibers, or carbon fibers, and a thermosetting matrix resin, such as an unsaturated polyester resin, a vinyl ester resin, an epoxy resin, a phenol resin, a benzoxazine resin, a cyanate resin, or a bismaleimide resin, has a light weight, and is excellent in mechanical properties, such as a strength, corrosion resistance, and fatigue resistance.

The fiber-reinforced composite material is molded by an approach such as: an autoclave molding method including using prepregs each obtained by impregnating the reinforcing fibers with the thermosetting matrix resin in advance; or a filament winding molding method or a resin transfer molding method including a step of impregnating the reinforcing fibers with a matrix resin that is liquid and a molding step based on heat curing. In the autoclave molding method out of those methods, the prepregs each obtained by impregnating the reinforcing fibers with the resin in advance are laminated, and then a pressure is reduced to bring the respective layers into close contact with each other, followed by the pressurization and heating of the resultant in an autoclave. Thus, a high-quality molded product can be obtained. However, the method has a drawback in that productivity is low because the pressure-reducing step and the curing step in the autoclave are long. In view of the foregoing, a prepreg compression molding method (PCM method) of obtaining the fiber-reinforced composite material as described below has been developed as an approach to improving the productivity. The prepregs laminated in advance are heated and pressurized in a mold so that the prepregs may be molded and the resin may be cured.

In the PCM method, prepregs are each produced by preliminarily impregnating reinforcing fibers, such as carbon fibers, with a thermosetting resin that thermally cures in a short time period, and the prepregs are subjected to pattern cutting, lamination, and preform shaping in advance in accordance with the shape of a molded product. After that, the preform is molded with a high-output hydraulic pressing machine at high pressure and high temperature for a short time period. Thus, a desired fiber-reinforced composite material can be obtained.

With regard to various characteristics that the prepregs to be used in the PCM method are required to have, the prepregs are of course required to be excellent in general mechanical properties. At the same time, each of the prepregs has been required to cure in a short curing time at a curing temperature at the time of its molding while being excellent in storage stability in order that its handling may be facilitated. This is because the shortening of the curing time can improve productivity in limited production facilities.

The PCM method includes a step of laminating the prepregs at room temperature in an operation to be performed before the press molding. However, when the surfaces of the prepregs each have strong tackiness (surface stickiness) in the step, it becomes difficult to make a correction in registration at the time of the lamination, thereby deteriorating workability. Further, when the prepregs adhere to unintended portions to cause a wrinkle or a lamination failure, a defective product is obtained, and hence a yield reduces. Accordingly, a material having low tackiness has been required for improving the productivity.

In addition, in the PCM method, the prepregs are each impregnated with the resin, and a thermosetting resin is used as the resin. The thermosetting resin has been required to have the storage stability and the rapid curability described in the foregoing. Further, the viscosity of the resin at the time of its curing is required to be free from excessively reducing. This is because of the following reason. When the viscosity of the resin is reduced by a temperature at the time of the press molding, the smoothness of the surface of the molded product is improved. However, when the time period for which the viscosity reduces is long, the resin leaks from a mold to make it impossible to obtain a desired molded product. In addition, when the curing reaction proceeds before the reduction in resin viscosity is completed, the resin does not sufficiently flow into the surface, and hence a problem in that the smoothness is impaired occurs. Accordingly, the achievement of a balance between the resin viscosity and a curing rate is important for the shortening of the curing time.

Further, in the PCM method, the molded product is required to be free from deforming at the time of its release from the mold after the press molding. In the PCM method, a molding temperature of from 140° C. to 150° C. is used, and at this time, in the case where the glass transition temperature of the molded product is lower than the temperature of the mold, the resin softens, and is hence liable to cause the deformation of the molded product at the time of the mold release in which the molded product is released from the mold. Accordingly, the use of a thermosetting resin having a glass transition temperature higher than the molding temperature is important for suppressing the deformation of the molded product at the time of the mold release.

In the press molding of a composite material using a mold, a thermosetting resin, such as an unsaturated polyester resin, a vinyl ester resin, or an epoxy resin, has heretofore been used. Each of the unsaturated polyester resin and the vinyl ester resin each having radical polymerizability has a low viscosity and is excellent in rapid curability, but involves a problem in that the mechanical properties of a molded product, such as heat resistance, a strength, and toughness, are relatively low. Meanwhile, the epoxy resin provides a molded product having high heat resistance, a high strength, and high toughness, but involves a problem in that the viscosity of the resin is relatively high. It is important that the viscosity of the resin to be molded by the PCM method at the time of its impregnation and molding be reduced.

In Patent Literature 1, there is a description that there is provided a one-component thermosetting epoxy resin composition that can be cured at low temperature in a short time period, and is excellent in storage stability, the epoxy resin composition including: an epoxy resin containing a bisphenol A-type epoxy resin and a urethane-modified epoxy resin; a curing agent containing dicyandiamide; a first curing accelerator containing 3,4-dichlorophenyl-1,1-dimethylurea; and a second curing accelerator containing an imidazole compound containing a triazine ring. However, when a compound having a urea structure, such as 3,4-dichlorophenyl-1,1-dimethylurea, is used as a curing accelerator, the glass transition temperature of the cured product tends to be liable to reduce. Accordingly, the composition has a drawback in that when the composition is applied to the PCM method, the deformation of a molded product is liable to be caused at the time of its release from a mold.

In Patent Literature 2, there is a description that the addition of a tetraglycidyl amine allows a cured product of resin composition to express a high glass transition temperature. However, many glycidyl amines are each poor in storage stability, and hence each have the following drawback. A blended product thickens during its production, or the resin composition, and by extension, a prepreg impregnated with a resin thicken during their storage, and in the worst case, a curing reaction proceeds to make it impossible to obtain a molded product.

In Patent Literature 3, there is a disclosure of an epoxy resin composition for a carbon fiber-reinforced composite material using an epoxy resin and a phenoxy resin. An epoxy resin containing a polynuclear body is used as the epoxy resin used in the literature. The amount of a polynuclear body component in the composition increases, and hence an increase in glass transition temperature of the cured product along with an increase in crosslink density thereof can be expected. In contrast, the epoxy resin has a drawback in that its viscosity is liable to increase, and hence the fluidity of the resin at the time of its molding is liable to be insufficient.

In Patent Literature 4, there is a disclosure of a resin composition including, as an essential component, 2,4-di (N, N-dimethylureido) toluene serving as a curing accelerator. However, while the curing temperature of the composition is 150° C., its glass transition temperature is about 140° C., and hence the composition has a drawback in that when the composition is applied to the PCM method, the composition is liable to deform at the time of its release from a mold at a molding temperature of 150° C.

In Patent Literature 5, there is a disclosure of a resin composition including, as an essential component, a dicyclopentadiene-type epoxy resin for the purpose of adjusting its tackiness at the time of handling. However, a cured product of the composition has a glass transition temperature of from 110° C. to 130° C., and hence the composition also has a drawback in that when the composition is applied to the PCM method, the composition is liable to deform at the time of its release from a mold at a molding temperature of 150° C.

CITATION LIST

Patent Literature

[PTL 1] JP 2014-185256 A
[PTL 2] JP 2016-504472 A
[PTL 3] JP 2010-248479 A
[PTL 4] JP 2003-128764 A
[PTL 5] JP 2005-225982 A

SUMMARY OF INVENTION

The present invention provides a resin composition for a fiber-reinforced composite material that has low tackiness at room temperature, and in particular, can improve productivity in a PCM method while achieving both of rapid curability and storage stability.

The inventors of the present invention have made an investigation to solve the problems, and as a result, have completed the present invention by blending an epoxy resin, a polymer component having a molecular weight of 10,000 or more, a curing agent, and a curing aid in an epoxy-based resin composition according to a specific formulation.

That is, according to one embodiment of the present invention, there is provided a resin composition for a fiber-reinforced composite material, including, as essential components: a liquid epoxy resin (A) that is liquid at 23° C.; a novolac-type epoxy resin (B); a polymer component (C) that is solid and has a weight-average molecular weight (Mw) of 10,000 or more; dicyandiamide (D); and an imidazole-based curing aid (E), wherein the resin composition includes 10 parts by mass to 35 parts by mass of the liquid epoxy resin (A), and 10 parts by mass to 25 parts by mass of the polymer component (C) out of 100 parts by mass of a total of the components (A) to (E), and has a glass transition temperature of 0° C. or more before curing thereof.

The resin composition for a fiber-reinforced composite material according to the one embodiment of the present invention desirably satisfies one or more of the following conditions:

(1) the polymer component (C) is a phenoxy resin, or is a bisphenol A-type epoxy resin that is solid, or contains both of the resins;

(2) the novolac-type epoxy resin (B) is a phenol novolac-type epoxy resin represented by the following general formula (1), and contains, in measurement in gel permeation chromatography (GPC), a dinuclear body at a ratio of 15% by area or less and a trinuclear body at a ratio of from 15% by area to 60% by area:

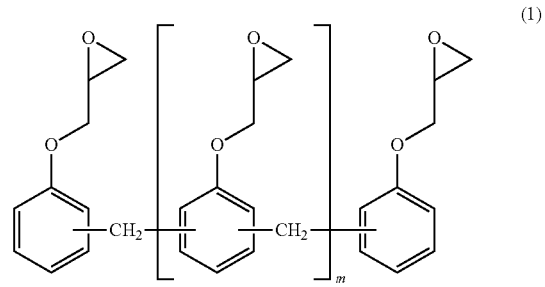

where "m" represents an integer of 0 or more;

(3) the imidazole-based curing aid (E) has a triazine ring structure in a structure thereof; and (4) the resin composition has a viscosity of from 1,000 mPa·s to 10,000 mPa·s at 90° C.

According to another embodiment of the present invention, there is also provided a fiber-reinforced composite material, which is obtained by blending the above-mentioned resin composition for a fiber-reinforced composite material with reinforcing fibers. In the fiber-reinforced composite material, a volume content of the reinforcing fibers is preferably from 25% to 75%.

According to yet another embodiment of the present invention, there is also provided a molded body, which is obtained by molding and curing the above-mentioned fiber-reinforced composite material by a prepreg compression molding method.

DESCRIPTION OF EMBODIMENTS

An embodiment of the present invention is described in detail below.

A resin composition for a fiber-reinforced composite material of the present invention includes, as essential components, an epoxy resin (A) that is liquid at 23° C., a novolac-type epoxy resin (B), a polymer component (C), dicyandiamide (D), and an imidazole-based curing aid (E). The liquid epoxy resin (A), the phenol novolac-type epoxy resin (B), the polymer component (C), the dicyandiamide (D), and the imidazole-based curing aid (E) having a triazine ring are hereinafter sometimes referred to as "component (A)", "component (B)", "component (C)", "component (D)", and "component (E)", respectively. The resin composition for a fiber-reinforced composite material of the present invention is sometimes referred to as "resin composition of the present invention."

The liquid epoxy resin (A) to be used in the present invention is an epoxy resin that is liquid at normal temperature (23° C.). Examples of such epoxy resin include a bisphenol A-type epoxy resin, a bisphenol F-type epoxy resin, and a glycidyl phenyl ether-type epoxy resin. The examples also include, but are not limited to, epoxy resins obtained by modifying those epoxy resins with, for example, a rubber or a urethane, and brominated epoxy resins obtained by brominating those epoxy resins. In addition, those epoxy resins may be used in combination thereof. Of those, the bisphenol A-type epoxy resin is preferably used. In addition, although the molecular weight of the component (A) varies depending on its structure, in the case of, for example, a bisphenol A-type bifunctional epoxy resin, its molecular weight is preferably 200 or more and less than 600, more preferably 500 or less. A novolac-type epoxy resin is not included in the component (A) even when the resin is liquid at 23° C., and the resin is regarded as the component (B) to be described later.

The blending amount of the component (A) is from 10 parts by mass to 35 parts by mass, preferably from 15 parts by mass to 30 parts by mass out of 100 parts by mass of the total of the components (A) to (E). When the content of the liquid epoxy resin is less than 15 parts by mass, the amount of the component that is liquid at normal temperature reduces, and hence the viscosity of the resin composition may be liable to increase to impair the impregnability thereof into fibers. In addition, when the content is more than 35 parts by mass, the viscosity excessively reduces to promote the occurrence of the leakage of the resin at the time of the molding of the resin composition. At the same time, the glass transition temperature of the cured product reduces owing to a reduction in crosslink density thereof, and hence a molded product is liable to deform at the time of its release from a mold.

It is desired that the blending amount of the novolac-type epoxy resin (B) be from 40 parts by mass to 70 parts by mass, preferably from 45 parts by mass to 70 parts by mass, more preferably from 50 parts by mass to 70 parts by mass out of 100 parts by mass of the total of the components (A) to (E).

Examples of the novolac-type epoxy resin (B) include a phenol novolac-type epoxy resin, a cresol novolac-type epoxy resin, and a bisphenol A novolac-type epoxy resin. Of those, a phenol novolac-type epoxy resin represented by the general formula (1) is preferred, and the resin desirably contains, in gel permeation chromatography (GPC) measurement, a dinuclear body at a ratio of 15% by area or less and a trinuclear body at a ratio of from 15% by area to 60% by area. Herein, the dinuclear body refers to such a component that in the general formula (1), m=0, and the trinuclear body refers to such a component that in the general formula (1), m=1. When the content of the dinuclear body is more than 15% by area, or the content of the trinuclear body is less than 15% by area, the crosslink density reduces, and hence the glass transition temperature is liable to reduce. In addition, when the content of the trinuclear body is more than 60% by area, the viscosity increases, and hence stable impregnability into fibers is impaired. The content of a polynuclear body that is tetranuclear or more is preferably 60% by area or less.

The novolac-type epoxy resin (B), which may have fluidity at normal temperature (23° C.), is preferably semisolid or solid.

In addition to the epoxy resins (A) and (B) to be used in the present invention, any other epoxy resin that is not liquid at normal temperature may be incorporated as long as its content is less than 15 parts by mass out of 100 parts by mass of the total of the components (A) and (B). There may be used, for example: bisphenol-type epoxy resins, such as a bisphenol E-type epoxy resin, a bisphenol S-type epoxy resin, a bisphenol Z-type epoxy resin, and an isophorone bisphenol-type epoxy resin each having two epoxy groups in a molecule thereof, or halogen and alkyl substitutes, and hydrogenated products of those bisphenols, and, in addition to the monomers, high-molecular weight bodies of those bisphenols each having a plurality of repeating units; alkylene oxide adducts of glycidyl ethers; alicyclic epoxy resins, such as 3,4-epoxy-6-methylcyclohexylmethyl-3,4-epoxy-6-methylcyclohexane carboxylate, 3,4-epoxycyclohexylmethyl-3,4-epoxycyclohexane carboxylate, and 1-epoxyethyl-3,4-epoxycyclohexane; aliphatic epoxy resins, such as trimethylolpropane polyglycidyl ether, pentaerythritol polyglycidyl ether, and a polyoxyalkylene diglycidyl ether; glycidyl esters, such as diglycidyl phthalate, diglycidyl tetrahydrophthalate, and dimer acid glycidyl ester; and glycidylamines, such as tetraglycidyldiaminodiphenylmethane, tetraglycidyldiaminodiphenylsulfone, triglycidylaminophenol, triglycidylaminocresol, and tetraglycidylxylylenediamine. Of those epoxy resins, an epoxy resin having two epoxy groups in a molecule thereof is preferred from the viewpoint of a viscosity increase ratio. Those resins may be used alone or in combination thereof. However, the Mw of each of those epoxy resins is never 10,000 or more.

The resin composition of the present invention includes the polymer component (C) for the purpose of adjusting its viscosity and its glass transition temperature when the resin composition is not cured. The polymer component shows a molecular weight (Mw) of 10,000 or more in measurement by GPC. The polymer component (C) increases the glass transition temperature of the resin composition and increases the viscosity thereof. However, when the Mw is less than 10,000, the blending amount of the component needed for setting the glass transition temperature of the uncured resin composition to 0° C. or more and obtaining a required viscosity increases. As the blending amount increases, the curing rate of the resin composition becomes slower, and the crosslink density thereof reduces to reduce the glass transition temperature of a cured product thereof.

It is desired that the polymer component (C) have a Tg higher than those of the components (A) and (B), be free of tackiness, and have a high melt viscosity. In addition, it is desired that the component be compatible with the components (A) and (B) to show a single Tg.

The blending amount of the polymer component (C) is from 10 parts by mass to 25 parts by mass, preferably from 10 parts by mass to 20 parts by mass out of 100 parts by mass of the total of resin components including the components (A) to (E). When the blending amount is small, the glass transition temperature when the resin composition is not cured becomes less than 0° C., and hence the tackiness of the resin composition strengthens to lead to the deterioration of the handleability thereof.

It is desired that a phenoxy resin or a bisphenol A-type epoxy resin having a Mw of 10,000 or more, or both of the resins be used as the polymer component (C).

The phenoxy resin is not particularly limited, but examples thereof include: phenoxy resins each having a bisphenol skeleton, such as a bisphenol A-type phenoxy resin, a bisphenol F-type phenoxy resin, and a bisphenol A-type/F-type mixed phenoxy resin (including a bisphenol A-type epoxy resin-phenol-formaldehyde polycondensate); phenoxy resins each having a naphthalene skeleton; and phenoxy resins each having a biphenyl skeleton. A commercial product of the bisphenol A-type phenoxy resin is, for example, YP-50, YP-50S, or YP-55U (manufactured by Nippon Steel & Sumikin Chemical Co., Ltd.). A commercial product of the bisphenol F-type phenoxy resin is, for example, FX-316 (manufactured by Nippon Steel & Sumikin Chemical Co., Ltd.). A commercial product of the bisphenol A-type/F-type mixed phenoxy resin is, for example, YP-70 or ZX-1356-2 (manufactured by Nippon Steel & Sumikin Chemical Co., Ltd.). Of those, the bisphenol A-type/F-type mixed phenoxy resin is preferably used because the resin shows excellent compatibility with the liquid epoxy resin (A) and such a viscosity that the resin is easily handled as a resin for a prepreg.

In addition, the bisphenol A-type epoxy resin is not particularly limited as long as its molecular weight (Mw) is 10,000 or more, but examples of a commercial product thereof include YD-017, YD-019, and YD-907 (each of which is manufactured by Nippon Steel & Sumikin Chemical Co., Ltd.).

In the resin composition of the present invention, the dicyandiamide (D) is used as a curing agent. The dicyandiamide is a curing agent that is solid at normal temperature, and is a latent curing agent excellent in storage stability at room temperature, the curing agent having the following characteristic: the curing agent hardly dissolves in an epoxy resin at room temperature, but when the curing agent is heated to 180° C. or more, the curing agent dissolves therein to react with an epoxy group. With regard to the usage amount of the curing agent, the curing agent is preferably blended in an amount in the range of from 0.2 equivalent to 0.8 equivalent (calculated by regarding the dicyandiamide as a tetrafunctional curing agent) with respect to 1 equivalent (mol) of the epoxy groups of epoxy resins including the epoxy resins (A) and (B). When the usage amount is less than 0.2 equivalent, the cross link density of the cured product reduces, and hence the glass transition temperature thereof is liable to reduce. When the usage amount is more than 0.8 equivalent, unreacted dicyandiamide is liable to remain, and hence the mechanical properties of the cured product tend to reduce.

The blending amount of the imidazole-based curing aid (E) in the resin composition of the present invention is desirably from 50 parts by mass to 250 parts by mass, preferably from 50 parts by mass to 100 parts by mass with respect to 100 parts by mass of the dicyandiamide (D). When the blending amount is small, it becomes difficult for the resin composition to express rapid curability, and when the blending amount is large, the cured product tends to be brittle.

In order to further satisfy not only the impregnability of the resin composition of the present invention into the reinforcing fibers at the time of its mixing and the suppression of the viscosity increase ratio thereof but also the heat resistance at the time of the curing thereof, it is preferred to use, as the imidazole-based curing aid (E), an imidazole-based compound, such as 2-methylimidazole, 1,2-dimethylimidazole, 2-ethyl-4-methylimidazole, 1-benzyl-2-methylimidazole, 2-undecylimidazole, 2-heptadecylimidazole, 2-phenylimidazole, 2-phenyl-4-methylimidazole, 2-phenyl-4,5-dihydroxymethylimidazole, or 1-cyanoethyl-2-ethyl-4-methylimidazole. Further, an imidazole compound having a triazine ring is preferred, and examples of such compound include 2,4-diamino-6-[2'-methylimidazolyl-(1')]-ethyl-s-triazine, 2,4-diamino-6-[2'-ethyl-4'-methylimidazolyl-(1')]-ethyl-s-triazine, and 2,4-diamino-6-[2'-undecylimidazolyl-(1')]-ethyl-s-triazine. Of those, 2,4-diamino-6-[2'-methylimidazolyl-(1')]-ethyl-s-triazine may be suitably used from the viewpoint that the compound can be cured in a short time period. The imidazole compounds may be used alone or in combination thereof.

The resin composition of the present invention may include a phenol-based curing accelerator as a curing accelerator. For example, any one of the following phenol compounds is used as the phenol-based curing accelerator for controlling the reactivity of the resin composition at the time of its curing and the stability thereof at the time of its storage: compounds such as catechol, 4-t-butylcatechol, pyrogallol, resorcin, hydroquinone, phloroglucinol, bisphenol A, bisphenol F, dihydroxybiphenyl, dihydroxynaphthalene, 1,1,1-tris (4-hydroxyphenyl) ethane, and bis(4-hydroxyphenyl)sulfone; and phenol-based polymers, such as a novolac-type or resol-type phenol resin and polyvinyl phenol. Of those, bisphenol F is suitable, and its purity (di-nuclear body content) is preferably 90% or more.

The blending amount of the phenol-based curing accelerator is from 0.01 part by mass to 10 parts by mass, preferably from 0.1 part by mass to 3.0 parts by mass with respect to 100 parts by mass of the entirety of the resin composition. In the case where the curing accelerator is incorporated in an amount in the range, the storage stability of the resin composition when the resin composition is turned into a prepreg is secured. At the same time, the acceleration of the curing thereof at the time of its curing is exhibited, and hence the curing time thereof can be shortened.

The resin composition of the present invention may further include any other stabilizer, modifier, or the like. A preferred stabilizer is, for example, a boric acid compound represented by $B(OR)_3$ (where R represents a hydrogen atom, an alkyl group, or an aryl group). The blending amount of the boric acid compound is from 0.01 part by mass to 10 parts by mass, preferably from 0.1 part by mass to 3 parts by mass with respect to 100 parts by mass of the entirety of the resin composition.

A defoaming agent or a leveling agent may be added as an additive to the resin composition of the present invention for the purpose of improving its surface smoothness. Any such additive may be blended in an amount of from 0.01 part by mass to 3 parts by mass, preferably from 0.01 part by mass to 1 part by mass with respect to 100 parts by mass of the entirety of the resin composition.

In the resin composition of the present invention, the polymer component (C) that is solid is heated and stirred together with the resin components including the component (A) and the component (B) so that the polymer component (C) may be melted and mixed therewith. Thus, a uniform resin composition is obtained. A target resin composition can be obtained by mixing the resin composition with the component (D) and the component (E). When the temperature of the resultant resin composition is increased from −50° C. to 280° C. with a differential scanning calorimeter, the glass transition temperature of the resin composition before its curing is observed, and then the exothermic reaction thereof along with the curing reaction thereof is observed. The glass transition temperature observed here affects the tackiness of the resin composition in an uncured state. When the glass transition temperature is 0° C. or more, the tackiness at normal temperature reduces. Further, after the resin composition has been impregnated into reinforcing fibers, the tackiness becomes extremely small, and hence its handleability becomes satisfactory.

In addition, the viscosity of the resin composition at 90° C. is preferably from 1,000 mPa·s to 10,000 mPa·s. When the viscosity falls within the range, the resin composition shows satisfactory impregnability into the reinforcing fibers, and hence hardly causes resin dripping from the fibers even after the impregnation. Herein, the viscosity is measured with an ICI viscometer. The viscosity at 90° C. more preferably falls within the range of from 3,000 mPa·s to 9,000 mPa·s.

In addition, the resin composition of the present invention may be blended with any other curable resin having a Mw of less than 10,000 to the extent that the effects of the present invention are not impaired. Examples of such curable resin include, but are not limited to, an unsaturated polyester resin, a curable acrylic resin, a curable amino resin, a curable melamine resin, a curable urea resin, a curable cyanate ester resin, a curable urethane resin, a curable oxetane resin, and a curable epoxy/oxetane composite resin.

A fiber-reinforced composite material of the present invention is obtained by blending the resin composition of the present invention with reinforcing fibers.

The resin composition for a fiber-reinforced composite material of the present invention is suitably used for a fiber-reinforced composite material obtained by a PCM method. Herein, although a method of producing a prepreg to be used in the PCM method is not particularly limited, such resin composition is warmed to from about 70° C. to about 90° C. in advance to be brought into a state in which its viscosity is reduced, followed by the application of the resin composition in a predetermined thickness onto release paper to produce a sheet-shaped resin composition. Herein, a method for the application is not particularly limited, and the resin composition may be applied with, for example, a knife coater or a reverse roll coater. The reinforcing fibers are sandwiched between the resultant sheet-shaped resin compositions, and then the resultant is heated and pressurized (typically at from 80° C. to 100° C.) with a roll or the like. Thus, a prepreg serving as a fiber-reinforced composite material impregnated with the resin composition can be obtained.

Although a method of producing the fiber-reinforced composite material from the resin composition for a fiber-reinforced composite material of the present invention is not particularly limited, in the PCM method, a predetermined molded product can be obtained through the following two steps: a preforming step including pattern cutting, lamination, and preform shaping; and a press molding step of molding the preform with a high-output hydraulic pressing machine at high pressure and high temperature (typically from 140° C. to 150° C.)

The fiber-reinforced composite material of the present invention refers to a material that is obtained by blending the resin composition with the reinforcing fibers, and that is not cured. A molded body of the present invention refers to a molded body obtained through the molding and curing of the fiber-reinforced composite material by the PCM method.

The reinforcing fibers to be used for the fiber-reinforced composite material of the present invention are selected from glass fibers, aramid fibers, carbon fibers, boron fibers, and the like. Of those, carbon fibers are preferably used for obtaining a fiber-reinforced composite material excellent in strength.

With regard to the tensile elongation at break of each of the reinforcing fibers to be used for the fiber-reinforced composite material, in general, the glass fibers each show a value of from 3% to 6%, the aramid fibers each show a value of from 2% to 5%, and the carbon fibers each show a value of from 1.5% to 2.0%. Accordingly, a material having a tensile elongation at break higher than that of each of the reinforcing fibers is desirably applied as the matrix resin for obtaining a fiber-reinforced composite material excellent in strength.

The volume content of the reinforcing fibers in the fiber-reinforced composite material of the present invention falls within the range of preferably from 30% to 75%, more preferably from 45% to 75%. When the volume content falls within the range, a molded body having a small number of voids and a high volume content of the reinforcing fibers is obtained, and hence a molded body having an excellent strength is obtained. The glass transition temperature of the resin composition after its curing is desirably 150° C. or more.

EXAMPLES

Next, the present invention is specifically described by way of Examples. However, the present invention is not limited to the following Examples without departing from the gist thereof. The term "part(s)" representing a blending amount means "part(s) by mass" unless otherwise stated. In addition, the unit of an epoxy equivalent is g/eq.

The molecular weight measurement of a polymer component was performed by using GPC, and its molecular weight was calculated from a calibration curve obtained by using a polystyrene standard substance. Measurement conditions are as described below.
Main body: HLC-8320GPC manufactured by Tosoh Corporation
Column: TSKgel GM HXL×2+TSKgel G4000 HXL manufactured by Tosoh Corporation
Column temperature: 40° C.
Eluent: tetrahydrofuran
Flow rate: 1 ml/min
Detector: refractive index (RI) detector The content of each component of a phenol novolac-type epoxy resin was measured by using GPC, and its dinuclear body content and trinuclear body content were each determined from the % by area of a peak. Measurement conditions are the same as those described above except that the columns were changed to TSKgel G4000 HXL+TSKgel G3000 HXL+TSKgel G2000 HXL manufactured by Tosoh Corporation.

A glass transition temperature Tg was measured with a differential scanning calorimeter (DSC7000X manufactured by Hitachi High-Tech Science Corporation). The measurement was performed as described below. The Tg of an uncured resin was determined from a change in heat quantity when the temperature of a resin composition was increased from −50° C. to 280° C. at a rate of temperature increase of 10° C./min. After that, the resin composition was cooled to 30° C. once, and the Tg of a cured product was determined from a change in heat quantity when the temperature was increased to 280° C. at 10° C./min again.

With regard to ICI viscosity measurement, the viscosity of a resin composition at 90° C. was measured with a cone-plate viscometer (CV-1S manufactured by Toa Kogyo).

A gel time was determined as described below. A resin composition was mounted on a hot plate at 150° C., and was continuously stirred with a stirring rod. A time point when the curing reaction of the resin composition proceeded on the hot plate, and hence the resin composition showed no cobwebbing and became a bulk on the hot plate was defined as an end point. The gel time was determined by measuring a time period from the mounting of the resin composition on the hot plate to the end point.

Tackiness was evaluated as described below. A resin composition was mounted on a PET film subjected to a release treatment, and a polyethylene film was mounted as a cover film on the resin composition by using a fluorine resin sheet having a thickness of 1 mm as a spacer. After that, the resultant was pressed at 60° C. for 5 min to produce a sample in which the PET film, the resin composition (having a thickness of 1 mm), and the polyethylene film were laminated in the stated order. The tackiness was evaluated by: leaving the produced sample in a thermostatic chamber at 23° C. at rest for 1 hr; and then indicating a case in which the polyethylene film was easily peeled at the time of the peeling of the polyethylene film by Symbol "o", and indicating a case in which the peeling of the polyethylene film was difficult or the resin composition remained on the polyethylene film by Symbol "x".

Each of the components used in Examples and Comparative Examples is abbreviated as described below.
YD-128: bisphenol A-type epoxy resin (manufactured by Nippon Steel & Sumikin Chemical Co., Ltd., epoxy equivalent: 187, liquid)
YDPN-6300: phenol novolac-type epoxy resin (manufactured by Nippon Steel & Sumikin Chemical Co., Ltd., dinuclear body: 10% by area, trinuclear body: 36% by area, epoxy equivalent: 173, semisolid)
YD-011: bisphenol A-type epoxy resin (manufactured by Nippon Steel & Sumikin Chemical Co., Ltd., Mw: 2,200, solid)
YD-017: bisphenol A-type epoxy resin (manufactured by Nippon Steel & Sumikin Chemical Co., Ltd., Mw: 11,000)
YD-019: bisphenol A-type epoxy resin; manufactured by Nippon Steel & Sumikin Chemical Co., Ltd., Mw: 21,000)
YP-70: bisphenol A-type/F-type mixed phenoxy resin (bisphenol A-type epoxy resin-phenol-formaldehyde polycondensate) (manufactured by Nippon Steel & Sumikin Chemical Co., Ltd., Mw: 40,000)
DICY: dicyandiamide (DICY ANEX 1400F, manufactured by F&F Chemical Co., Ltd.)
2MZA-PW: imidazole compound (2,4-diamino-6-[2'-methylimidazolyl-(1')]-ethyl-s-triazine, manufactured by Shikoku Chemicals Corporation)
BPF: phenolic curing accelerator (bisphenol F, dinuclear body purity: 97%)

Preparation Example 1 (Main Agent 1)

167 g of YD-128 and 1,544 g of YDPN-6300 were loaded into a four-necked glass separable flask mounted with a stirring apparatus and a temperature gauge, and were heated to 150° C. After that, 172 g of YD-019 and 114 g of YP-70 were loaded into the flask. The mixture was stirred at 150° C. for 1.5 hr. After the visual observation of the dissolution of YD-019 and YP-70, the solution was filtered with a #100 mesh woven wire to provide a main agent 1.

Preparation Examples 2 to 6 (Main Agents 2 to 6)

Main agents 2 to 6 were each prepared by the same procedure as that of Preparation Example 1 except that the blending amounts of the liquid epoxy resin (A), the phenol novolac-type epoxy resin (B), and the polymer component (C) were set to values shown in Table 1.

In Table 1 and Table 2, blending amounts are represented in the units of "g".

Preparation Example 7 (Curing Agent H)

503 g of DICY, 377 g of 2MZA-PW, and 1,120 g of YD-128 were used, and were stirred at room temperature with a planetary mixer for 15 min to provide a curing agent H. With regard to a state of dispersion, it was confirmed with a grind gauge that the materials were uniformly dispersed.

Preparation Example 8 (Curing Accelerator S)

75 g of BPF and 225 g of YD-128 were loaded into a four-necked glass separable flask mounted with a stirring apparatus and a temperature gauge, and the temperature of the mixture was increased to 90° C., followed by stirring for 30 min. After the observation of the dissolution of BPF, the solution was filtered with a #100 mesh woven wire to provide a curing accelerator S.

Example 1

382 g of the curing agent H, 20 g of the curing accelerator S, 7 g of tributyl borate serving as a stabilizer, and 1,591 g of the main agent 1 warmed to 80° C. were loaded into a planetary mixer, and were stirred for 15 min while being warmed to 60° C. Thus, a resin composition was obtained.

Examples 2 and 3

Resin compositions were each prepared by the same procedure as that of Example 1 except that the preparation was performed according to a formulation shown in Table 2.

The blending amounts of the respective components converted by setting the total amount of each of the prepared resin compositions to 100 parts by mass are shown in the units of part(s) by mass in Table 3.

Comparative Examples 1 to 3

Preparation was performed by the same procedure as that of Example 1 except that: the preparation of the main agent was performed according to a formulation shown in Table 1; and the preparation of the resin composition was performed according to a formulation shown in Table 2. The blending amounts of the respective components converted by setting the total amount of each of the prepared resin compositions to 100 parts by mass are shown in the units of part(s) by mass in Table 3.

TABLE 1

|        | Epoxy equivalent | Main agent 1 | Main agent 2 | Main agent 3 | Main agent 4 | Main agent 5 | Main agent 6 |
|---|---|---|---|---|---|---|---|
| YD-128    | 187    | 167   | 238   | 241   | 225   | 215   | 229   |
| YDPN-6300 | 173    | 1,544 | 1,387 | 1,362 | 1,374 | 1,601 | 1,486 |
| YD-017    | 1,950  |       | 34    |       |       |       |       |
| YD-019    | 2,850  | 172   | 227   | 227   |       | 184   |       |
| YP-70     | 12,000 | 114   | 114   | 170   |       |       | 286   |
| YD-011    | 475    |       |       |       | 401   |       |       |

TABLE 2

|                     | Example 1 | Example 2 | Example 3 | Comparative Example 1 | Comparative Example 2 | Comparative Example 3 |
|---|---|---|---|---|---|---|
| Main agent          | Main agent 1 | Main agent 2 | Main agent 3 | Main agent 4 | Main agent 5 | Main agent 6 |
|                     | 1,591 | 1,607 | 1,611 | 1,589 | 1,574 | 1,593 |
| Curing agent H      | 382   | 366   | 362   | 384   | 399   | 380   |
| Curing accelerator S| 20    | 20    | 20    | 20    | 20    | 20    |
| Tributyl borate     | 7     | 7     | 7     | 7     | 7     | 7     |

TABLE 3

|           | Example 1 | Example 2 | Example 3 | Comparative Example 1 | Comparative Example 2 | Comparative Example 3 |
|---|---|---|---|---|---|---|
| YD-128    | 18   | 20   | 20   | 20   | 21   | 21   |
| YDPN-6300 | 61   | 56   | 55   | 55   | 63   | 59   |
| YD-011    |      |      |      | 16   |      |      |
| YD-017    |      | 1    |      |      |      |      |
| YD-019    | 7    | 9    | 9    |      | 7    |      |
| YP-70     | 5    | 5    | 7    |      |      | 11   |
| DICY      | 5    | 5    | 5    | 5    | 5    | 5    |
| 2MZA-PW   | 3.5  | 3.5  | 3.5  | 3.5  | 3.5  | 3.5  |
| BPF       | 0.2  | 0.2  | 0.2  | 0.2  | 0.2  | 0.2  |
| Tributyl borate | 0.3 | 0.3 | 0.3 | 0.3 | 0.3 | 0.3 |

The results of the measurement of the various physical properties of the resin compositions of Examples 1 to 3 and Comparative Examples 1 to 3 are shown in Table 4.

TABLE 4

|                      | Example 1 | Example 2 | Example 3 | Comparative Example 1 | Comparative Example 2 | Comparative Example 3 |
|---|---|---|---|---|---|---|
| Tg of uncured resin (° C.) | 2.0   | 2.6   | 3.5   | −0.4  | −1.5  | −0.2  |
| Viscosity (mPa · s)        | 3,900 | 6,800 | 9,000 | 560   | 1,100 | 4,900 |
| Tg of cured product (° C.) | 164   | 157   | 159   | 156   | 162   | 157   |
| Gel time (sec)             | 43    | 42    | 42    | 42    | 42    | 42    |
| Tackiness                  | ○     | ○     | ○     | x     | x     | x     |

As shown in Table 4, in each of Examples 1 to 3, the glass transition temperature of the uncured resin was 0° C. or more, and hence the polyethylene film was able to be easily peeled in the peel test. In addition, the cured product showed a glass transition temperature as high as 150° C. or more, and the gel time at 150° C. was 42 sec, that is, the resin composition showed a fast curing rate. In contrast, in Comparative Example 1, the molecular weight of the polymer component was low. Accordingly, the glass transition temperature of the uncured resin was 0° C. or less, and hence the polyethylene film could not be peeled in the peel test. Thus, it was confirmed that the tackiness of the resin composition was poor. Further, it was found that the resin composition was liable to flow at the time of its impregnation into fibers because its viscosity at 90° C. was low. In each of Comparative Examples 2 and 3, the viscosity at 90° C. was sufficient. However, the glass transition temperature of the uncured resin was 0° C. or less, and hence the polyethylene film could not be peeled in the peel test. Thus, it was confirmed that the tackiness of the resin composition was poor.

INDUSTRIAL APPLICABILITY

The resin composition for a fiber-reinforced composite material of the present invention has low tackiness at around room temperature under a prepreg state, and is hence excellent in workability. In addition, the resin composition has a low viscosity in an impregnating step, and an increase in viscosity thereof along with its warming is small. Accordingly, the resin composition has satisfactory impregnability into reinforcing fibers and provides a molded product excellent in rapid curability. In particular, the resin composition is suitably used for a fiber-reinforced composite material obtained by the PCM method.

The invention claimed is:

1. A resin composition for a fiber-reinforced composite material, comprising, as essential components:
   a liquid epoxy resin (A) that is liquid at 23° C.;
   a novolac epoxy resin (B);
   a polymer component (C) that is solid and has a weight-average molecular weight of 10,000 or more, the polymer component being a bisphenol A epoxy resin or containing both of a phenoxy resin and the bisphenol A epoxy resin;
   dicyandiamide (D); and
   an imidazole-based curing aid (E),
   wherein the resin composition comprises 10 parts by mass to 35 parts by mass of the liquid epoxy resin (A), and 10 parts by mass to 25 parts by mass of the polymer component (C) out of 100 parts by mass of a total of the components (A) to (E), and has a glass transition temperature of 0° C. or more before curing thereof; and
   wherein the novolac epoxy resin (B) is a phenol novolac epoxy resin represented by the following general formula (1), and contains, in measurement in gel permeation chromatography, a dinuclear body at a ratio of 15% by area or less and a trinuclear body at a ratio of from 15% by area to 60% by area:

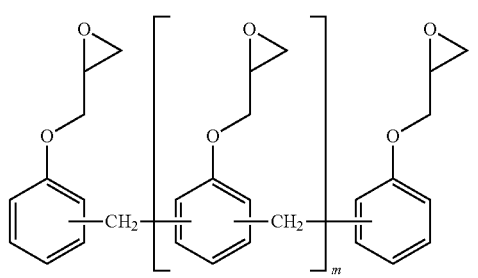

(1)

where "m" represents an integer of 0 or more.

2. The resin composition for a fiber-reinforced composite material according to claim 1, wherein the imidazole-based curing aid (E) has a triazine ring structure in a structure thereof.

3. A fiber-reinforced composite material, which is obtained by blending the resin composition for a fiber-reinforced composite material of claim 2 with reinforcing fibers.

4. The fiber-reinforced composite material according to claim 3, wherein a volume content of the reinforcing fibers is from 25% to 75%.

5. The resin composition for a fiber-reinforced composite material according to claim 1, wherein the resin composition has a viscosity of from 1,000 mPa·s to 10,000 mPa·s at 90° C.

6. A fiber-reinforced composite material, which is obtained by blending the resin composition for a fiber-reinforced composite material of claim 5 with reinforcing fibers.

7. The fiber-reinforced composite material according to claim 6, wherein a volume content of the reinforcing fibers is from 25% to 75%.

8. A fiber-reinforced composite material, which is obtained by blending the resin composition for a fiber-reinforced composite material of claim 1 with reinforcing fibers.

9. The fiber-reinforced composite material according to claim 8, wherein a volume content of the reinforcing fibers is from 25% to 75%.

10. A method of producing a molded body, comprising molding and curing the fiber-reinforced composite material of claim 9 by a prepreg compression molding method.

11. A molded body, which is obtained by molding and curing the fiber-reinforced composite material of claim 9 by a prepreg compression molding method.

12. A method of producing a molded body, comprising molding and curing the fiber-reinforced composite material of claim 8 by a prepreg compression molding method.

13. A molded body, which is obtained by molding and curing the fiber-reinforced composite material of claim 8 by a prepreg compression molding method.

14. A fiber-reinforced composite material, which is obtained by blending the resin composition for a fiber-reinforced composite material of claim 1 with reinforcing fibers.

15. The fiber-reinforced composite material according to claim 14, wherein a volume content of the reinforcing fibers is from 25% to 75%.

16. A method of producing a molded body, comprising molding and curing the fiber-reinforced composite material of claim 15 by a prepreg compression molding method.

17. A molded body, which is obtained by molding and curing the fiber-reinforced composite material of claim 15 by a prepreg compression molding method.

18. A method of producing a molded body, comprising molding and curing the fiber-reinforced composite material of claim 14 by a prepreg compression molding method.

19. A molded body, which is obtained by molding and curing the fiber-reinforced composite material of claim 14 by a prepreg compression molding method.

* * * * *